No. 750,749. PATENTED JAN. 26, 1904.
A. P. BRUSH.
TESTING DEVICE FOR SELF PROPELLED VEHICLES.
APPLICATION FILED SEPT. 29, 1903.
NO MODEL.
2 SHEETS—SHEET 1.
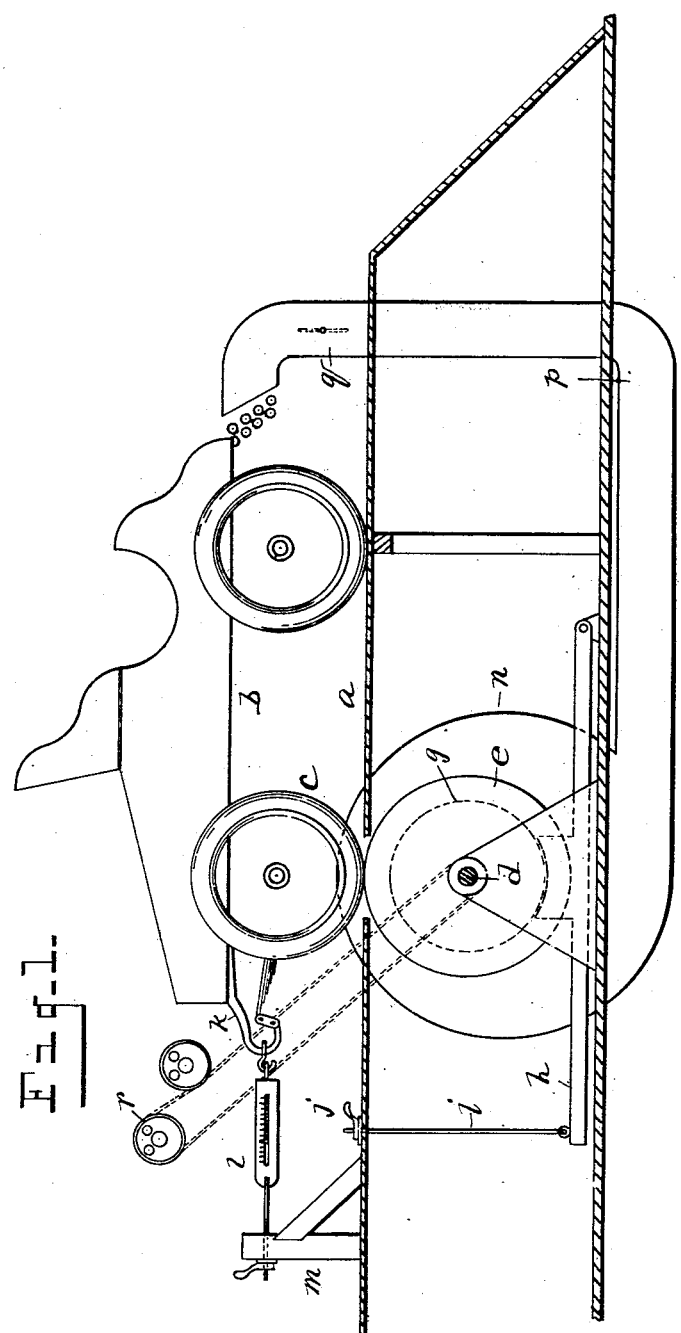

No. 750,749. PATENTED JAN. 26, 1904.
A. P. BRUSH.
TESTING DEVICE FOR SELF PROPELLED VEHICLES.
APPLICATION FILED SEPT. 29, 1903.
NO MODEL. 2 SHEETS—SHEET 2.
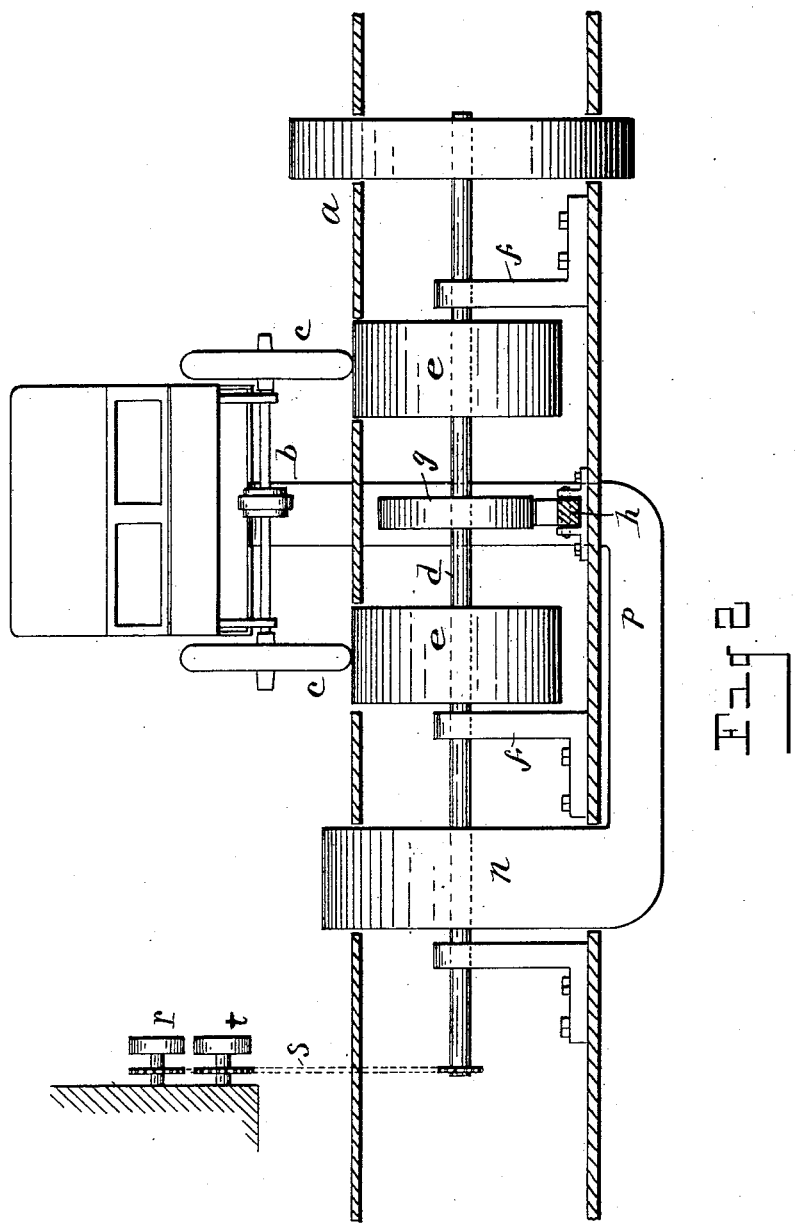
WITNESSES:
INVENTOR.
Alanson P. Brush
BY Newell S. Wright
ATTORNEY.

No. 750,749.

Patented January 26, 1904.

UNITED STATES PATENT OFFICE.

ALANSON P. BRUSH, OF DETROIT, MICHIGAN.

TESTING DEVICE FOR SELF-PROPELLED VEHICLES.

SPECIFICATION forming part of Letters Patent No. 750,749, dated January 26, 1904.

Application filed September 29, 1903. Serial No. 175,044. (No model.)

*To all whom it may concern:*

Be it known that I, ALANSON P. BRUSH, a citizen of the United States, residing at Detroit, county of Wayne, State of Michigan, have invented a certain new and useful Improvement in Testing Devices for Self-Propelled Vehicles, of which the following is a specification, reference being had to the accompanying drawings, which form a part of this specification.

My present invention has for its object a novel testing apparatus, the same being more particularly designed and adapted for testing automobiles; and it consists of the construction, combination, and arrangement hereinafter described and claimed, and illustrated in the accompanying drawings, in which—

Figure 1 is a view in side elevation showing parts in vertical longitudinal section. Fig. 2 is a view in end elevation and showing parts in vertical cross-section.

More particularly, my invention is designed to provide an automobile-testing apparatus for testing the power thereof.

I carry out my invention as follows:

In the drawings, $a$ represents a floor or support for the automobile, (indicated at $b$.)

$c\ c$ represent the rear wheels of the automobile.

Beneath the floor or support $a$ is located a shaft $d$, carrying friction-wheels $e\ e$, the floor or support $a$ being cut low, as shown, so that the rear wheels of the automobile may contact with the friction-wheels $e\ e$. The shaft $d$ is supported upon suitable bearings $f\ f$ and is provided also with a brake wheel or disk $g$. A brake-lever is indicated at $h$, constructed to bear against the brake-wheel $g$. The lever is shown provided with a connecting-rod $i$, projecting up from the support $a$ and provided with a hand-nut $j$, whereby the pressure of the brake-lever upon the brake-wheel may be varied as may be desired. I do not limit myself to this particular mechanism for varying the application of the brake or to any particular brake mechanism, as any suitable brake mechanism will come within the scope of my invention. Connected with the rear of the automobile, as with the rear spring $k$, for example, is any suitable testing-scale, (indicated at $l$,) one end of which is engaged with the stationary post or similar device $m$. To supply an air-blast upon the front of the vehicle similar to that which the automobile would meet in actual travel, I employ any suitable blower (indicated at $n$) provided with a discharge-pipe $p$ to discharge at the front of the vehicle. The blower would be actuated by the rotation of the shaft $d$. The pipe $p$ may be provided with any suitable damper, (indicated at $q$.) Air discharged upon the front of the vehicle may be regulated so as to be approximately equal to the blast upon the vehicle in travel. The air-blast may be cut off altogether, if desired. Any suitable tachometer or any speed-recording device may be employed (indicated at $r$) which may be actuated from the shaft $d$, as by a chain $s$, for example. If the propelling power of the automobile (not shown) be set in motion, it will be evident that the rear wheels will be set in motion, also the friction-wheels $e$, the friction being varied by the brake mechanism, the brake mechanism enabling the power to be varied.

I am enabled thus to measure the maximum speeds attainable at different amounts of pull.

The mechanism herewith shown and described permits all tests being made of extreme accuracy. By this means I am enabled to test the power of the vehicle available at the rear wheels and the efficiency of the different gears of the vehicle, also the efficiency of the cooling device of the vehicle. The apparatus will also permit of the comparison of the effect of different inflations of tires. The power and efficiency of the reversing mechanism may also be tested hereby.

It will be evident that any resistance of the friction-wheels $e\ e$ against being revolved by the driving-wheels of the vehicle reacts upon the vehicle, giving it a tendency to move forward or backward, according to the direction in which the driving-wheels are running. If the floor be level and the center of the axle upon which the rear wheels of the vehicle revolve be placed vertical above the center of the shaft of the friction-wheels, any tendency to move forward upon the part of the vehicle will be recorded by the measuring device or scale $l$, and if this tendency to move forward be measured in pounds and multiplied by the rim velocity of the wheels $e\ e$ recorded by the recording device $r$ the product will be the power developed by the rear wheels of the vehicle, since the friction on the shaft $d$ may be varied. Different vehicles may be tested by this apparatus or the same vehicle at different speeds and for different powers of the propelling mechanism.

It will be evident that extreme accuracy may be obtained, as the friction of the working parts of the device cannot in any way affect the accuracy of the records. Where extreme accuracy is desired, the air-blast against the front of the vehicle may be temporarily entirely cut off, thereby eliminating its pressure. It will be obvious that a cyclometer $t$ may also be used and that the tachometer and cyclometer may both be driven by a chain geared with the driven shaft $d$, which will give to them a constant proportion of the shaft $d$. It will also be evident that the tachometer might be graduated to read in miles per hour or feet per minute the speed of the rim of the friction-wheels $e\ e$, which would correspondingly record the rim speed of driving-wheels of the vehicle.

It is desirable that the shaft $d$ should be equipped with a fly-wheel, as shown, in order to give it considerable momentum in running, and thus enable the efficiency of the braking mechanism to be tested. It is also desirable to test the accelerating power of the driving mechanism, thus duplicating the effect of putting the vehicle itself in motion upon the road.

The measuring device is made adjustable, so that the center of the rear axle of the vehicle over the axle of the friction-wheels may be maintained, and thus eliminate any effect of the weight of the vehicle.

The vehicle will be accurately balanced, the front wheels being upon a level floor and the rear wheels being placed with the axle centered over the axle of the friction-wheels upon which the rear wheels of the vehicle revolve.

What I claim as my invention is—

1. In a testing device for vehicles the combination of rotatable friction-wheels, brake mechanism for said wheels, means for measuring the traction effect of the vehicle, and means for producing an air-blast upon the front of the vehicle.

2. In a testing device for vehicles the combination of rotatable friction-wheels, brake mechanism for said wheels, means for measuring the traction effect of the vehicle, means for producing an air-blast, said means arranged to automatically control said blast.

3. In a testing device for vehicles the combination of rotatable friction-wheels provided with a shaft, brake mechanism therefor, means for measuring the traction effect of the vehicle, and means for producing an air-blast, actuated by the shaft of said wheels.

4. In a testing device for vehicles the combination of a support, rotatable friction-wheels located below the support, adjustable brake mechanism therefor, means for producing an air-blast, mechanism to control the blast, and a horizontally-adjustable scale to engage the vehicle.

5. In a testing device for vehicles the combination of rotatable friction-wheels, means for producing an air-blast automatically controlled by the revolution of the friction-wheels, a speed-recording device, a horizontally-adjustable traction-scale, and brake mechanism to control said wheels.

In testimony whereof I have signed this specification in the presence of two subscribing witnesses.

ALANSON P. BRUSH.

Witnesses:
N. S. WRIGHT,
M. L. SIMMONS.